United States Patent
Eberspäch

(10) Patent No.: US 7,331,118 B2
(45) Date of Patent: Feb. 19, 2008

(54) CONDITIONING SYSTEM FOR A VEHICLE AND METHOD OF DRYING AN EVAPORATOR OF AN AIR CONDITIONING UNIT PROVIDED IN SUCH A CONDITIONING SYSTEM

(75) Inventor: Günter Eberspäch, Wolfschlugen (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 498 days.

(21) Appl. No.: 10/980,413

(22) Filed: Nov. 2, 2004

(65) Prior Publication Data

US 2005/0126772 A1    Jun. 16, 2005

(30) Foreign Application Priority Data

Nov. 3, 2003    (DE) ................... 103 51 241

(51) Int. Cl.
*F26B 19/00* (2006.01)
(52) U.S. Cl. .................... 34/86; 34/90; 34/218
(58) Field of Classification Search ............. 34/380, 34/381, 474, 86, 90, 218; 62/91, 94, 99; 165/41, 42
See application file for complete search history.

(56) References Cited

U.S. PATENT DOCUMENTS

| | | | | |
|---|---|---|---|---|
| 5,355,690 | A | * | 10/1994 | Iritani et al. ............... 62/184 |
| 5,450,894 | A | * | 9/1995 | Inoue et al. ............... 165/43 |
| 6,726,114 | B2 | * | 4/2004 | Blaschke et al. ........... 237/2 R |
| 2003/0094261 | A1 | | 5/2003 | Abouchaar |
| 2005/0205552 | A1 | * | 9/2005 | Han et al. ............... 219/540 |

FOREIGN PATENT DOCUMENTS

| | | |
|---|---|---|
| DE | 40 28 787 C1 | 8/1991 |
| DE | 100 60 301 A1 | 1/2003 |
| EP | 1 306 246 A1 | 5/2003 |
| EP | 1 342 966 A1 | 9/2003 |
| JP | 11 042934 A | 2/1999 |

OTHER PUBLICATIONS

European Search Report for corresponding European Application dated Jan. 26, 2006.
European Patent Office, Patent Abstracts of Japan, Publication No. 11042934 published Feb. 16, 1999.

* cited by examiner

*Primary Examiner*—S. Gravini

(57) ABSTRACT

A conditioning system for a vehicle comprises an evaporator, positioned in an air conducting channel means, of an air conditioning unit, by means of which evaporator heat and/or moisture can be removed from the air to be introduced into a vehicle interior, a heating means being provided at the evaporator for at least local heating of the same.

5 Claims, 1 Drawing Sheet

CONDITIONING SYSTEM FOR A VEHICLE AND METHOD OF DRYING AN EVAPORATOR OF AN AIR CONDITIONING UNIT PROVIDED IN SUCH A CONDITIONING SYSTEM

BACKGROUND OF THE INVENTION

The present invention relates to a tempering system for a vehicle and a method of drying an evaporator of an air conditioning unit provided in such a conditioning system.

TECHNICAL FIELD

In modern motor vehicles, the air to be introduced into the vehicle interior can be conditioned in various ways. It is firstly possible to cool the air to be introduced into the vehicle interior, or remove moisture from this air, by activating an air conditioning unit. For this purpose, such air conditioning units in general have an evaporator through which a refrigerant flows, a cooling action being produced by evaporation of the refrigerant and moisture also being thereby removed from the air flowing around the evaporator. It is furthermore known that air to be introduced into the vehicle interior can be heated by heat transfer to this air, for example from a cooling circuit of an internal combustion engine or other heating means. Heated, yet however dried, air can be introduced into the vehicle interior by simultaneous operation of the air conditioning unit and heat transfer to the air to be introduced.

In such systems, the problem increasingly exists that lamellar structures providing very fine small interspaces are formed in that region in which the evaporator acts for heat removal from the air flowing around it. The water precipitating from the air being cooled is held fast in this fine lamellar structure by capillary forces, with the result that because of moisture retained for long periods in this region, undesired growth of microorganisms can occur. This can lead to the formation of odorous substances which cannot be filtered out by filter apparatus from the air to be introduced into the vehicle interior.

Furthermore, the collection of moisture in the region of the evaporator has the result that for example also with high air humidity or comparatively low temperatures, the risk of fogging of the window panes of the vehicle is increased.

SUMMARY OF THE INVENTION

The present invention has as its object to provide a conditioning system for a vehicle, and also a method of drying an evaporator in such a conditioning system, with which in a reliable but constructionally simple manner moisture collected in the region of such an evaporator can be removed.

According to a first aspect of the present invention, this object is attained by a conditioning system for a vehicle, comprising an evaporator, positioned in an air conducting channel means, of an air conditioning unit, by means of which evaporator heat and/or moisture is to be removed from the air to be introduced into a vehicle interior, a heating means being provided at the evaporator for at least local heating of the same.

By the provision of a heating means at the evaporator itself, thus e.g. integrated into the evaporator itself, it becomes possible to heat this evaporator itself and by the heating to ensure an increased water removal.

It is advantageous if the heating means can be operated electrically, since then drying of the evaporator can also be performed in phases in which sufficient heat to heat the evaporator cannot be provided in other system regions.

Here it is possible, for example, that the evaporator is constructed at least locally of a material, and/or is coated with a material, which can be heated by electrical excitation. Since, as already stated above, the evaporator generally has a lamellar heat transfer structure for heat exchange with the air to be introduced into the vehicle interior, and moisture will above all collect in this region, it is therefore further proposed that the lamellar heat transfer structure is constructed at least locally of a material, and/or is coated therewith.

An aspect of the invention which is particularly advantageous for control technological reasons provides that the material is PTC material. By the use of PTC material for such a heating means, i.e. a material whose electrical resistance rises with temperature, it is only necessary to apply a predetermined voltage, for example the voltage available in the vehicle electrical supply. An equilibrium temperature will be set by the electrical resistance which increases with the heating, and an equilibrium will be established at a temperature which can also be determined by the nature and geometry of this material. Thus no further control or regulation technological measures have to be taken to ensure that a given limiting temperature is not exceeded.

According to a further aspect of the present invention, the above object is attained by a conditioning system for a vehicle comprising an evaporator, positioned in an air conducting channel means, of an air conditioning unit, by means of which evaporator heat and/or moisture can be withdrawn from air to be introduced into a vehicle interior, a heat exchanger means being provided in the air conducting channel means, by means of which heat can be supplied to this circulating air, and wherein the heat exchanger means is upstream of the evaporator in the air flow direction, at least in an evaporator drying operation phase.

It is elementary in this solution that at least in given operating phases, namely to dry the evaporator, the air flow is conducted such that in contrast to the conventionally provided arrangement, it first flows around the heat exchanger means, in which air is normally heated for introduction into the vehicle interior, and only thereafter flows around the evaporator. In this manner, heat is transported by this air circulation toward the evaporator. At the evaporator, this air then ensures the heating of the same, or respectively an increased evaporation of moisture collected there.

In order to be able to reach the state described above, it is proposed that the air conducting channel means can be placed in a first air-conducting state in which air first flows around the heat exchanger means and thereafter the evaporator.

Since the air flowing around the evaporator and then conducted away from this will have a comparatively high moisture content in a phase in which the evaporator is to be dried by heating it, to avoid fogging of the inside of the vehicle windows it can be advantageous if with the air conducting channel means in a first air conducting state the air conducting channel means does not introduce the air flowing around the evaporator into a vehicle interior. For example, the air conducting moisture away from the evaporator can be discharged outside, i.e. to the environment. Particularly with comparatively low external temperatures, it may however be that even during such a drying phase it is desired that the vehicle interior is heated by supplying warm air. In order then to reduce as far as possible the risk of fogging the window panes of the vehicle, it is furthermore proposed that with the air conducting channel means set in the first air conducting state air conducting channel means introduces the air flowing around the evaporator substantially into a region near the floor of a vehicle interior.

Since in normal operating states, i.e., states in which the evaporator is not dried and is used, for example, for cooling and/or drying the air, in general it is advantageous if the air flow is first around the evaporator and then the heat exchanger means, it is further proposed that the air conducting channel means can be set in a second air conducting state in which the air first flows around the evaporator and then the heat exchanger means.

In a system which is particularly advantageous as regards its flexibility, it can be provided that the air conducting channel means can be set in a second air conducting state in which the air does not flow around the evaporator after having flowed around the heat exchanger means.

In such a system, in order to be able to efficiently cool the air when the external temperatures are comparatively high, it is further proposed that the air conducting channel means can be set in a third air conducting state in which the air flows around the evaporator without flowing around the heat exchanger means.

If the air is to be neither cooled nor dried nor heated, it can be further provided that the air conducting channel means can be set in a fourth state in which the air flows around neither the heat exchanger means nor the evaporator.

According to a further aspect of the invention, the above-mentioned object is attained by means of a method of drying an evaporator of an air conditioning unit provided in a conditioning system in which method heat is supplied to the evaporator for moisture removal, the method being performed when a vehicle having the conditioning system is not in a travel state.

As already stated hereinabove, the drying of the evaporator induced by heat supply is critical to the extent that thereby the air flowing around the evaporator carries with it a comparatively high moisture content. If however this drying of the evaporator is undertaken in a phase in which a vehicle is not being operated, the risk of undesired fogging of the windows of a vehicle in a travel state can be avoided.

Here it is particularly advantageous if the method is performed in connection with the ending of a travel operating state.

In this phase after ending the travel operating state, it is taken that sufficient heat is still present, particularly in the region of the internal combustion engine and its cooling system, which can be used for heating the evaporator and thus removing moisture from it. It is only necessary to make sure that air from the heat exchanger means is transported toward the evaporator and then for example after moisture uptake can be ejected to the outside.

BRIEF DESCRIPTION OF THE DRAWINGS

The present invention is described in detail hereinafter with reference to the accompanying drawings.

DETAILED DESCRIPTION OF THE INVENTION

Figure 1:
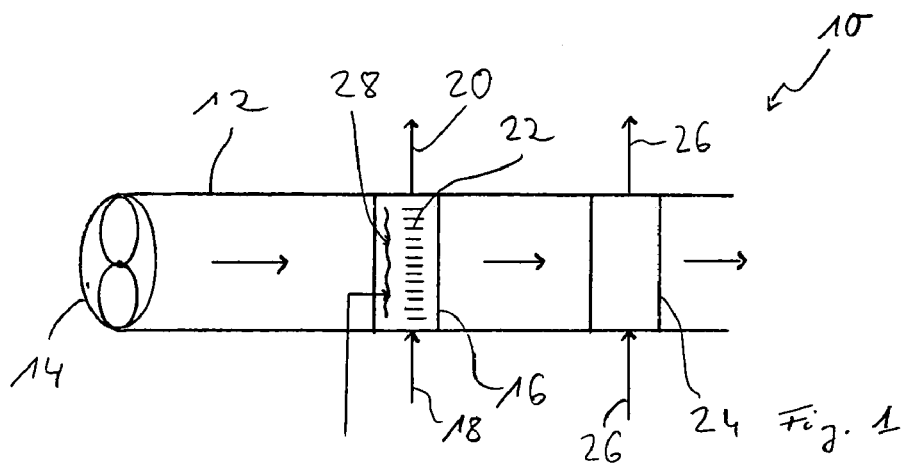
FIG. 1 shows a schematic diagram of a conditioning system according to the invention.

A conditioning system according to the invention is generally denoted by 10 in FIG. 1. This conditioning system 10 comprises an air conducting channel means 12 in which air from the exterior, i.e. the environment, can be transported into a vehicle interior. For this purpose, an air forwarding fan 14, indicated only schematically, is provided in the air conducting channel means 12, and air can be forwarded thereby in the direction of the flow arrows indicated in the air conducting channel means 12. Following the air forwarding fan 14 in the flow direction is an evaporator 16 of an air conditioning unit. A refrigerant 18 is supplied to this evaporator 16 in conditioning operation. The refrigerant 18 evaporates in the evaporator 16 and thereby takes up heat from the air flowing around the evaporator 16. A refrigerant vapor 20 then leaves the evaporator 16.

In order to attain an efficient heat transfer from the air flowing around the evaporator 16 to the liquid refrigerant 18, such evaporators 16 are generally provided with a very fine lamellar structure 22. This provides a very large heat transfer surface.

The air flowing around the evaporator 16 and then cooled or also dried, in the operation of an air conditioning unit having the evaporator 16, then flows further toward a heat exchanger 24. This heat exchanger 24 is for example supplied with the cooling liquid 26 heated in the internal combustion engine and after heat transfer to the air flowing around the heat exchanger 24 then conducted away again toward the internal combustion engine or another vehicle cooler.

It should be mentioned here that the diagram of the conditioning system 10 is only schematic and is to show the advantageous aspects of the invention mentioned hereinafter. In particular, different variations can of course be provided as regards the air conduction. Thus the air flowing around the evaporator 16 could also be conducted such that it does not necessarily also flow around the heat exchanger 24, so that for pure cooling operation the heat exchanger 24 is bypassed. For this purpose corresponding air guiding flaps ensure a deflection. Also by means of air guiding flaps arranged for example downstream of the heat exchanger 24, it can be ensured that the air can be introduced specifically into different regions of the vehicle interior or possibly not at all into the vehicle interior and for example discharged to the environment.

A heating means 28 is furthermore provided on the evaporator 16 in the conditioning system 10 shown in FIG. 1. This can for example be provided by constructing the lamellar structure 22 of a material which is heated on electrical excitation, i.e., by application of a voltage. It is also possible to coat various surface regions of the evaporator 16, particularly the lamellar structure 22, with such material. By the application of a voltage to the heating means 28, this is excited and leads to heating the evaporator 16, particularly in a region thereof near the surface. For this purpose the heating means 28 can be under the control of a control means (not shown) which makes sure that the heating arrangement 28 is excited in given operating phases, further described below, in order thus to heat the evaporator 16.

So-called PTC (positive temperature coefficient) material has been found suitable for such a heating means. Such material has an electrical resistance which increases with increasing material temperature. Thus if a predetermined voltage, which can for example be taken from the vehicle power supply, is applied to this material or the heating means 28, with suitable choice of material and material dimensions a given temperature can be set which represents an equilibrium state. This temperature can be chosen such that on excitation of the heating means 28 it is sufficient to conduct moisture away which has collected in air conditioning operation in the region of the evaporator 16 and above all in the region of the lamellar structure 22. Since, as previously mentioned, this lamellar structure 22 can above all be constructed of such material or coated with such material, according to this advantageous aspect of the invention, the heat is above all made available where it can be efficiently used.

In the conditioning system 10 shown in FIG. 1, care can also be taken that for example moisture collected there is periodically dispersed by heating the evaporator 16 and is carried away by the air flowing around the evaporator 16. The risk of microorganism formation and thus the production of odorous substances in the region of the evaporator 16 can thus be reduced or excluded in this way.

Since a comparatively high moisture content is transported with the air flowing around the evaporator 16 in such a drying operation, it can be advantageous to conduct this air after flowing around the evaporator 16 so that is does not get directly into the region of the window panes of a vehicle having such a system 10. It can be provided here, for example, that before or after flowing around the heat exchanger 24, this air is discharged to the outside and thus does not at all get into the interior. It is further possible to introduce this air, or at least a portion thereof, into the region near the floor of the vehicle, so that in fact heating can still take place, but a direct contact with the window panes on the inside with this moisture-enriched air will not occur.

According to a further advantageous aspect of the invention, it can be provided that this operation for drying the evaporator 16 can be undertaken when the vehicle is not in its travel operating state. Here it is advantageous to perform the drying process, for example, in a phase in which the vehicle is shut down and thus for example travel operation has ended, and in which the internal combustion engine has been turned off. During this drying process, in the conditioning system shown in FIG. 1, the heating means 28 is then excited. Simultaneously the air forwarding fan 14 is operated, in order to be able to transport moisture away with air flowing around the then heated evaporator 16. This air can then, for example, be discharged into the environment again, in order to avoid introduction of the moist air into the vehicle interior.

In order for such a system, as shown in FIG. 1, to be able to furnish sufficient energy, various sources can be used. Thus a generator running in travel operation, or the electrical energy delivered by this, can of course be used. Also batteries on the vehicle, for example in a roof-mounted solar cell or the like, can be used, such auxiliary energy sources, batteries or solar cells being above all advantageous when, as described above, the drying operation is to be undertaken, when the vehicle itself is out of operation and thus a generator integrated into the drive train can deliver no energy.

Figure 2:
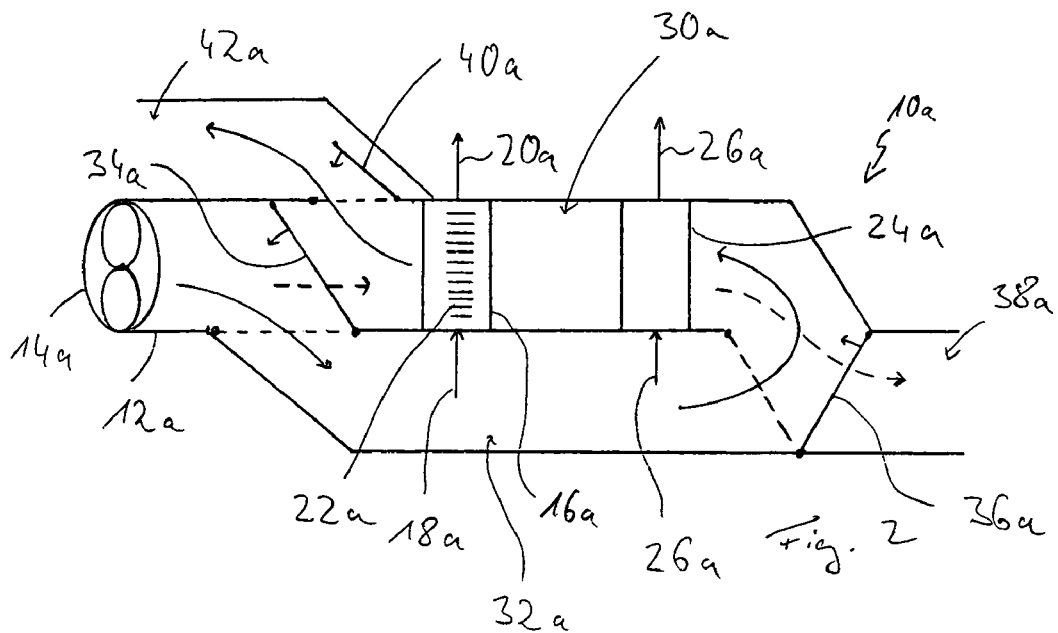
FIG. 2 shows a view corresponding to FIG. 1 of an alternative conditioning system according to the invention.

An alternative embodiment of a conditioning system according to the invention is shown in FIG. 2. System regions or components which correspond in structure or function to previously described components are given the same reference numerals but with an added "a".

In the conditioning system 10 shown in FIG. 2, the air conducting channel means 12*a* comprises two mutually parallel channel sections 30*a*, 32*a*. The evaporator 16*a* and the heat exchanger 24*a* are arranged in the channel section 30*a*. A reversible flap means 34*a* is arranged in a section of the air conducting channel means 12*a* located upstream of the evaporator 16*a* or between the evaporator 16*a* and the air forwarding fan 14*a*. In the position shown in FIG. 2, this flap means 34*a* closes the channel section 30*a* between the air forwarding fan 14*a* and the evaporator 16*a* but opens the channel section 32*a*. On changing the flap means 34*a* into the position shown dashed in FIG. 2, the channel section 32*a* is closed while the channel section 30*a* is opened.

A further reversible flap means 36*a* is provided downstream of the heat exchanger 24*a*, i.e., at the opposite side of the heat exchanger 24*a* with respect to the positioning of the air forwarding fan 14*a*. In the state shown in FIG. 2, this flap means 36*a* closes a further channel section 38*a*, leading for example to the vehicle interior, while it produces in this manner a connection between the two channel sections 32*a*, 30*a*. In the state of this flap means 36*a* shown dashed in FIG. 2, this closes the channel section 32*a*, while a connection is established between the channel section 30*a* and the channel section 38*a*.

Furthermore, a further flap means 40*a* is provided in the section 30*a* in the region located between the air forwarding fan 14*a* and the evaporator 16*a* or respectively also the flap means 34*a* and the evaporator 16*a*. This produces in the state shown in FIG. 2 a connection between the section 30*a* and the further channel section 42*a*, which for example again leads outside, and thus to the environment. On changing the flap mans 40*a* into the position shown dashed in FIG. 2, the connection between the sections 30*a* and 42*a* can be interrupted.

In FIG. 2, the conditioning system 10*a* shown there is in an operating state in which the evaporator 16*a* can be dried by being heated. The flap means 34*a* is changed over such that the air, with the forwarding action of the air forwarding fan 14*a*, does not flow toward the evaporator 16*a* but flows in the channel section 32*a*. Furthermore the flap means 36*a* is changed over so that the air flowing through the channel section 32*a* cannot reach the channel section 38*a* but flows from the channel section 32*a* into the channel section 30*a* and there first encounters the heat exchanger 24*a*. Since this heat exchanger receives heat from the engine cooling means 26*a*, the air flowing around this is first heated and then flows toward the evaporator 16*a*. The evaporator 16*a* is then heated by this heated air, particularly in the region of its lamellar structure 22*a*. Due to this heating, moisture is increasingly given up by the evaporator 16*a* and entrained with this circulating air. This air then enters the channel section 42*a* and is for example discharged outside.

If this conditioning system 10*a* is to be brought into a normal operating state, the three flap means 34*a*, 36*a* and 40*a* are brought into the state shown by dashed lines. The air then flows from the air forwarding fan 14*a* directly toward the channel section 30*a* and there to the evaporator 16*a*. After flowing around the evaporator 16*a* it can also flow around the heat exchanger 24*a* and then be conducted via the channel section 38*a* into the vehicle interior. Furthermore care can of course be taken, as in the embodiment shown in FIG. 1, that in this normal conditioning state the air, after having flowed around the evaporator 16*a*, at least partially does not flow toward the heat exchanger 24*a*, but comes directly through a bypass channel duct (not shown) from the evaporator 16*a* to the channel section 38*a* and into the interior, in order to avoid a subsequent heating of the once previously cooled air.

The system shown in FIG. 2 is thus basically reversible between two states. In a first state which can be seen in FIG. 2, it is changed over such that it can be used for drying the evaporator 16*a*, and the air carrying the moisture away can for example be discharged to the outside. In a second state, the system can be used normally, to make sure, using the evaporator 16*a* and/or the heat exchanger 24*a*, that the air to be introduced into the vehicle interior is cooled, dried, or else heated, With this system also, it is possible to proceed so that drying of the evaporator 16a is undertaken when a vehicle having this conditioning system 10a is out of operation. The flap means 34a, 36a, 40a can then be brought into the state shown in FIG. 2 and by operation of the air forwarding fan 14a the air can be driven to flow in the direction shown by the arrow. In particular, directly after ending travel operation, sufficient heat is still available in the region of the internal combustion engine and its whole cooling system in order to be able, by continuing circulation of the cooling medium 26a, to still make sufficient heat available in the region of the heat exchanger 24a for heating the air. It can furthermore be advantageous here to have additional energy supply systems, such as a fuel cell, solar cell, or batteries, available in order to be able to have sufficient electrical energy available when the vehicle is itself out of operation for operating the system components required in this state.

Figure 3:
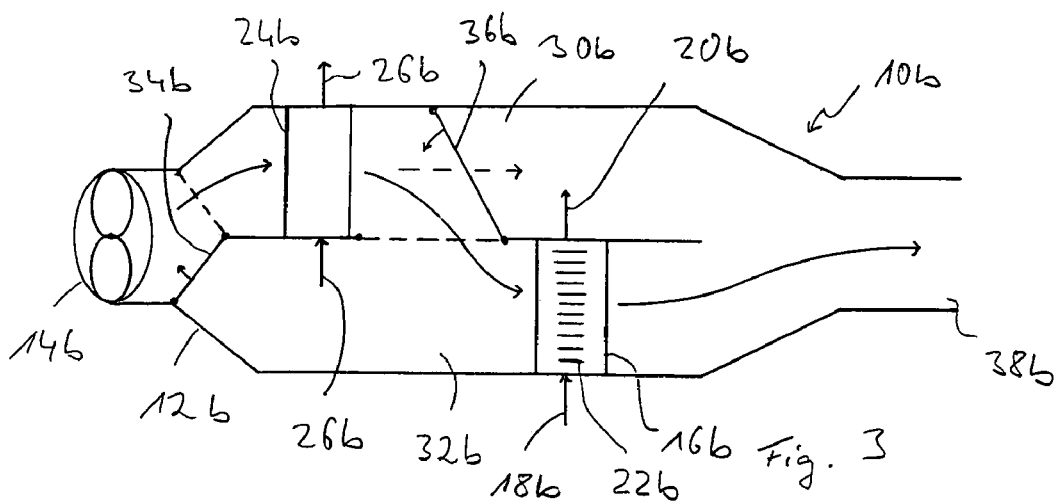
FIG. 3 shows a further view corresponding to FIG. 1 of an alternative conditioning system according to the invention.

A further conditioning system according to the invention is shown in FIG. 3. Components which correspond in structure or function to previously described components are given the same reference numerals but with an added "b".

In the conditioning system 10b shown in FIG. 3, the two channel sections 30b and 32b of the air conducting channel means 12b are again present. Into which of the channel sections 30b or 32b the air forwarded by the air forwarding fan 14b can flow can again be provided by means of the flap means 40b. In contrast to the embodiment according to FIG. 2, it is now provided in the system 10b that the evaporator 16b and the heat exchanger 24b are not positioned in the same but in different channel sections 30b or 32b respectively. It can be seen that the heat exchanger 24b is located in the channel section 30b, while the evaporator 16b is located in channel section 32b. A connection between the two channel sections 30b and 32b can now be selectively established, by means of the flap means 36b, and with the connection produced the channel section 30b is substantially closed downstream of the heat exchanger 24b, so that, as indicated by the full arrows, the air forwarded by the air forwarding fan 14b toward the heat exchanger 24b reaches the channel section 32b, and thence the evaporator 16b, after flowing around the heat exchanger 24b. After flowing around the evaporator 16b, the air leaves the channel section 32b, for example toward the channel section 38b leading to the vehicle interior. It can also furthermore be provided here, for example downstream of the evaporator 16b, that the air can be selectively introduced into the vehicle interior or for example discharged to the outside.

In the conditioning system 10b shown in FIG. 3, in the position shown of the flap means 34b, 36b, the heat forwarded from the cooling medium 26b is transferred to the air in the heat exchanger 24b, which air then flows to and heats the evaporator 16b. With this heating, moisture collected in the evaporator 16b can be entrained and for example discharged to the outside or when needed fed into the vehicle interior, for example again in a region near the floor. If the system is not to be operated in the drying mode described above, the two flap means 34b, 36b, according to the operating mode required, can be changed over or respectively partially not changed over. If for example the system is to work in a purely air conditioning mode, the two flap means 34b, 36b are changed over into their respective positions shown dashed. This means that the air forwarded by the air forwarding fan 14b can only arrive in the channel section 32b and thus can reach the evaporator 16b, give up heat and moisture there and then be conducted into the vehicle interior via the channel section 38b. If no air conditioning mode, but for example a heating mode is to be used, the flap means 34b will be left in the state shown in FIG. 3, while the flap means 36b is changed over into the dashed state. The air then flows to the heat exchanger 24b, takes up heat there, and goes, as shown by the dashed arrow, toward the channel section 38b and thus to the vehicle interior. If the system is in fact to be operated in heating mode, with comparatively low external temperature and high air humidity, but also drying of the warm air to be forwarded to the vehicle interior is to be simultaneously provided, the flap means 34b, 36b can be set in the state shown in FIG. 3, or left in this state, so that the air first enters the channel section 30b, flows there around the heat exchanger 24b and takes up heat, and thereafter is conducted in the channel section 32b and flows around the evaporator 16b or its lamellar structure 22b. Since in this state the air conditioning unit is also operated and the refrigerant 18b is thus evaporated in the evaporator, the air which was previously comparatively strongly heated gives up a portion of its heat and its moisture and now arrives, somewhat cooled but still heated and enriched with moisture compared with the environmental temperature, in the channel section 38b.

The conditioning system 10b shown in FIG. 3 can also be operated for drying the evaporator 16b preferably when a vehicle having this system 10b is not in operation or has just been put out of operation. In this state heat can still be taken from the still circulating cooling medium and transferred to the evaporator 16b. For this purpose it is required, for example, to provide for the cooling circuit an electrically operable cooling medium pump which can work independently of the operation of the drive assembly. In order to be able to ensure this operation of the conditioning system 10b independently of the operation of the drive assembly, for drying the evaporator 16b, one of the sources mentioned hereinabove may be present for providing electrical energy.

The systems according to the invention described hereinabove thus enable, with a comparatively simple construction, a reliable removal of the moisture which has collected over time in an evaporator of an air conditioning unit. In particular, with the use of an electrically excitable heating means on the evaporator itself, it is of course possible also to use this so as to additionally heat the air being introduced into the vehicle interior, for example in a phase in which sufficient heat is not yet available from the drive assembly.

I claim:

1. A conditioning system for a vehicle, comprising an evaporator (16a), positioned in an air conducting channel means (12a), of an air conditioning unit, by which evaporator (16a) heat or moisture is to be removed from the air to be introduced into a vehicle interior, a heat exchanger (24a) being provided in the air conducting channel (12a), by which heat is supplied to this circulating air, and wherein the air conducting channel (12a) is settable in a first air conducting state in which air flows first around the heat exchanger (24a) and thereafter the evaporator (16a) such that the heat exchanger (24a) is upstream of the evaporator (16a) in an air flow direction in an evaporator drying operation phase, and wherein the air conducting channel (12a) is settable in a second air conducting state, in which air first flows around the evaporator (16a) and then around the heat exchanger (24a), wherein an air forwarding fan (14a) is arranged in the air conducting channel means (12a) upstream of the evaporator (16a) and the heat exchanger (24a) in the first air conditioning state and the second air conditioning state.

2. The conditioning system according to claim 1, wherein with the air conducting channel (12a) set in the first air conducting state, the air conducting channel means (12a) does not introduce air flowing around the evaporator (16a) into the vehicle interior.

3. The conditioning system according to claim 1, wherein with the air conducting channel (12a) set in the first air conducting state, the air conducting channel means (12a)

introduces the air flowing around the evaporator (16*a*) substantially into a region near a floor of a vehicle interior.

4. The conditioning system according to claim 1, wherein the air conducting channel is settable in a third air conducting state, in which air flows around the evaporator without flowing around the heat exchanger.

5. The conditioning system according to claim 1, wherein the air conducting channel is settable in a fourth air conducting state, in which the air flows neither around the heat exchanger nor the evaporator.

* * * * *